US008468012B2

(12) United States Patent
Lloyd et al.

(10) Patent No.: US 8,468,012 B2
(45) Date of Patent: *Jun. 18, 2013

(54) ACOUSTIC MODEL ADAPTATION USING GEOGRAPHIC INFORMATION

(75) Inventors: Matthew I. Lloyd, Cambridge, MA (US); Trausti Kristjansson, Hartsdale, NY (US)

(73) Assignee: Google Inc., Mountain View, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 12/787,568

(22) Filed: May 26, 2010

(65) Prior Publication Data

US 2011/0295590 A1 Dec. 1, 2011

(51) Int. Cl.
*G06F 17/20* (2006.01)

(52) U.S. Cl.
USPC ............... 704/8; 704/246; 704/247; 704/251; 704/252

(58) Field of Classification Search
None
See application file for complete search history.

(56) References Cited

U.S. PATENT DOCUMENTS

| | | | |
|---|---|---|---|
| 6,778,959 B1 | 8/2004 | Wu et al. | |
| 6,839,670 B1 | 1/2005 | Stammler et al. | |
| 6,876,966 B1 | 4/2005 | Deng et al. | |
| 6,950,796 B2 | 9/2005 | Ma et al. | |
| 6,959,276 B2 | 10/2005 | Droppo et al. | |
| 7,257,532 B2 | 8/2007 | Toyama | |
| 7,392,188 B2 | 6/2008 | Junkawitsch et al. | |
| 7,424,426 B2 | 9/2008 | Furui et al. | |
| 7,451,085 B2 | 11/2008 | Rose et al. | |
| 7,941,189 B2 | 5/2011 | Miyauchi | |
| 7,996,220 B2 | 8/2011 | Rose et al. | |
| 2003/0236099 A1 | 12/2003 | Deisher et al. | |
| 2004/0138882 A1 | 7/2004 | Miyazawa | |
| 2004/0230420 A1* | 11/2004 | Kadambe et al. | 704/205 |
| 2005/0187763 A1 | 8/2005 | Arun | |
| 2005/0216273 A1* | 9/2005 | Reding et al. | 704/275 |
| 2008/0027723 A1* | 1/2008 | Reding et al. | 704/231 |
| 2008/0091435 A1* | 4/2008 | Strope et al. | 704/277 |
| 2008/0091443 A1* | 4/2008 | Strope et al. | 705/1 |
| 2008/0188271 A1 | 8/2008 | Miyauchi | |
| 2008/0221887 A1* | 9/2008 | Rose et al. | 704/246 |
| 2009/0030687 A1 | 1/2009 | Cerra et al. | |
| 2009/0271188 A1 | 10/2009 | Agapi et al. | |
| 2011/0137653 A1* | 6/2011 | Ljolje et al. | 704/255 |

OTHER PUBLICATIONS

Bocchieri et al., "Use of geographical meta-data in ASR language and acoustic models", Acoustics Speech and Signal Processing (ICASSP), 2010 IEEE International Conference on IEEE, Mar. 14, 2010, pp. 5118-5121.
International Search Report from related PCT Application No. PCT/US2011/037558, dated Jul. 29, 2011.
International Search Report and Written Opinion for International Application No. PCT/US2011/029407, mailed Jun. 7, 2011, 10 pages.
Honda, Masashi, Authorized Officer, The International Bureau of WIPO, Application No. PCT/US2011/037558, in International Preliminary Report on Patentability dated Dec. 6, 2012.

* cited by examiner

*Primary Examiner* — Leonard Saint Cyr
(74) *Attorney, Agent, or Firm* — Fish & Richardson P.C.

(57) ABSTRACT

Methods, systems, and apparatus, including computer programs encoded on a computer storage medium, for enhancing speech recognition accuracy. In one aspect, a method includes receiving an audio signal that corresponds to an utterance recorded by a mobile device, determining a geographic location associated with the mobile device, adapting one or more acoustic models for the geographic location, and performing speech recognition on the audio signal using the one or more acoustic models model that are adapted for the geographic location.

16 Claims, 4 Drawing Sheets

ACOUSTIC MODEL ADAPTATION USING GEOGRAPHIC INFORMATION

BACKGROUND

This specification relates to speech recognition.

A user of a mobile device may enter text by, for example, typing on a keyboard or speaking into a microphone. In the context of voice input, an Automated Search Recognition ("ASR") engine may have difficulty accurately recognizing spoken words when the sounds associated with a particular language vary based on an accent of the user. As spoken by a New Yorker or a Bostonian, for example, a typical ASR engine may recognize the word "park," as the words "pork" or "pack," respectively.

SUMMARY

In general, one innovative aspect of the subject matter described in this specification may be embodied in methods for automatically training, selecting, generating, or otherwise adapting, by an ASR engine, one or more acoustic models that are geographic-location specific (or "geo-specific") to one or more geographic areas. The acoustic models are applied to audio signals (or "samples," or "waveforms") that are "geotagged" with location information, to perform speech recognition by comparing the audio signals to statistical representations of the sounds that make up each word of a particular language. The one or more acoustic models may include a single acoustic model that is geographic-location specific to a single geographic area or to multiple geographic areas.

As used by this specification, "geotagged" audio signals refer to signals that have been associated, or "tagged," with location metadata (e.g., geographic location metadata, or relative location metadata) or geospatial metadata. Among other things, the location metadata may include navigational coordinates, such as latitude and longitude, altitude information, bearing or heading information, name or address information associated with the location, relative position or direction information, or information that references a type of a location.

The methods for adapting the acoustic models include receiving geotagged audio signals recorded by multiple mobile devices in multiple geographic locations, and adapting one or more acoustic models using at least a portion of the geotagged audio signals. Upon receiving an utterance recorded by a mobile device within or near one of the geographic locations, the ASR engine may perform speech recognition on the utterance using the adapted acoustic model or models. Notably, the acoustic models may be adapted before, during, or after the utterance is received.

The utterance may correspond to any type of voice input, such as an input to a voice search query system, a dictation system, or a dialog system. In the context of a voice search query system, a "search query" includes one or more query terms that a user submits to a search engine when the user requests the search engine to execute a search query, where a "term" or a "query term" includes one or more whole or partial words, characters, or strings of characters. Among other things, a "result" (or a "search result") of the search query includes a Uniform Resource Identifier (URI) that references a resource that the search engine determines to be responsive to the search query. The search result may include other things, such as a title, preview image, user rating, map or directions, description of the corresponding resource, or a snippet of text that has been automatically or manually extracted from, or otherwise associated with, the corresponding resource.

In general, another innovative aspect of the subject matter described in this specification may be embodied in methods that include the actions of receiving an audio signal that corresponds to an utterance recorded by a mobile device, determining a geographic location associated with the mobile device, adapting one or more acoustic models for the geographic location, and performing speech recognition on the audio signal using the one or more acoustic models model that are adapted for the geographic location.

Other embodiments of these aspects include corresponding systems, apparatus, and computer programs, configured to perform the actions of the methods, encoded on computer storage devices.

These and other embodiments may each optionally include one or more of the following features. In various examples, adapting one or more acoustic models further include adapting one or more acoustic models before receiving the audio signal that corresponds to the utterance; adapting one or more acoustic models further include adapting one or more acoustic models after receiving the audio signal that corresponds to the utterance; the actions further include receiving geotagged audio signals that correspond to audio recorded by multiple mobile devices in multiple geographic locations; and adapting one or more acoustic models for the geographic location further includes adapting one or more acoustic models for the geographic location using a subset of the geotagged audio signals; the actions further include determining, for each of the geotagged audio signals, a distance between the geographic location associated with the mobile device and a geographic location associated the geotagged audio signal, and selecting, as the subset of the geotagged audio signals, the geotagged audio signals that are associated with geographic locations which are within a predetermined distance of the geographic location associated with the mobile device, or that are associated with geographic locations which are among an N closest geographic locations to the geographic location associated with the mobile device; the actions further include selecting, as the subset of the geotagged audio signals, the geotagged audio signals that are associated with the geographic location that is also associated with the mobile device; the actions further include selecting the subset of the geotagged audio signals based on the geographic location associated with the mobile device, and based on context data associated with the utterance; the context data includes data that references a time or a date when the utterance was recorded by the mobile device, data that references a speed or an amount of motion measured by the mobile device when the utterance was recorded, data that references settings of the mobile device, or data that references a type of the mobile device; adapting the acoustic model include training a Gaussian Mixture Model (GMM) using the subset of the geotagged audio signals as a training set; the utterance represents a voice search query, or an input to a digital dictation application or a dialog system; determining the geographic location further includes receiving data referencing the geographic location from the mobile device; determining the geographic location further includes determining a past geographic location or a default geographic location associated with the mobile device; the actions further include generating one or more candidate transcriptions of the utterance, and executing a search query using the one or more candidate transcriptions; adapting one or more acoustic models for the geographic location further includes selecting, from among multiple acoustic models that have been generated for multiple geographic locations, the one or more acoustic models generated for the geographic location associated with the mobile device; adapting one or more acoustic models for the geographic location further includes incorporating data that references the geographic location into a feature space used by a single acoustic model; incorporating data that references the geographic location into a feature space used by the single acoustic model further includes incorporating values into a feature space used by the single acoustic model, where the values are Mel-frequency Cepstral Coefficients and geographic coordinates; adapting one or more acoustic models for the geographic location further includes incorporating data that references the geographic location into state information included in a single acoustic model; and/or adapting one or more acoustic models for the geographic location further includes deriving a transformation matrix associated with the geographic location, and applying the transformation matrix to a single, universal acoustic model.

Particular embodiments of the subject matter described in this specification may be implemented to realize one or more of the following advantages. Speech recognition accuracy may be improved. Acoustic models may be adapted using utterances that accurately reflect the differences in accents, dialects, or speech patterns that exist within a given language, and that may occur across different geographic regions. Speech recognition may be performed at the server side, instead of on the client device, to allow for enhanced process optimization and to increase computational efficiency.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
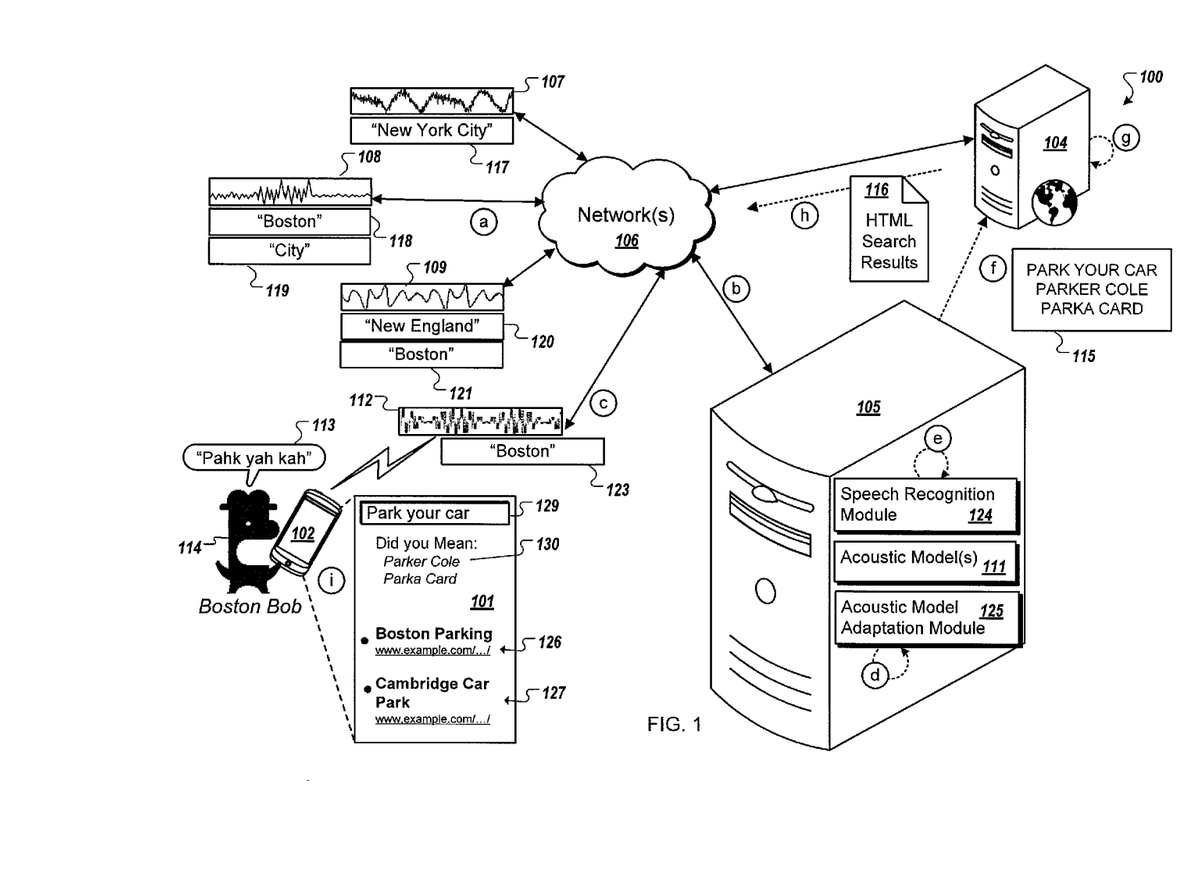
FIG. 1 is a diagram of an example system that uses geotagged audio to enhance speech recognition accuracy.

FIG. 1 is a diagram of an example system 100 that uses geotagged audio to enhance speech recognition accuracy. FIG. 1 also illustrates a flow of data within the system 100 during states (a) to (i), as well as a user interface 101 that is displayed on a mobile device 102 of the system 100 during state (i). Briefly, the system 100 adapts one or more acoustic models that are geo-specific to one or more geographic areas. The acoustic models are applied to audio signals that are geotagged with location information, to perform speech recognition by comparing the audio signals to statistical representations of the sounds that make up each word of a particular language.

In more detail, the system 100 includes the mobile device 102, which is in communication with a server 104 and an ASR engine 105 over one or more networks 106. The server 104 may be a search engine, a dictation engine, a dialogue system, or any other engine or system that uses transcribed speech, or that invokes a software application that uses transcribed speech, to perform some action. The networks 106 may include a wireless cellular network, a wireless local area network (WLAN) or Wi-Fi network, a Third Generation (3G) or Fourth Generation (4G) mobile telecommunications network, a private network such as an intranet, a public network such as the Internet, or any appropriate combination thereof. The states (a) through (i) depict a flow of data that occurs when an example process is performed by the system 100. The states (a) to (i) may be time-sequenced states, or they may occur in a sequence that is different than the illustrated sequence.

According the example process illustrated in FIG. 1, the ASR engine 105 receives geotagged audio signals 107 to 109 from various devices (e.g., the mobile device 102 or other mobile or non-mobile devices), and adapts one or more geo-specific acoustic models 111 for one or more multiple geographic locations using the geotagged audio signals 107 to 109. The geo-specific acoustic models 111 may include one, single acoustic model that is adapted to be geo-specific to one geographic location or more than one geographic location, or the geo-specific acoustic models 111 may include two or more acoustic models that are collectively adapted to be geo-specific to one geographic location, or that are each adapted to be geo-specific to a different geographic location.

When an audio signal 112 that corresponds to an utterance 113 recorded by the mobile device 102 is received, one or more geographic locations associated with the mobile device 102 (or the user 114 ("Boston Bob") of the mobile device 102) are determined. The ASR engine 105 transcribes the utterance 113 using the geo-specific acoustic models 111 that match, or that the ASR engine 105 determines to be suitable for, the geographic locations associated with the mobile device 102 (or the user 114 of the mobile device 102). One or more candidate transcriptions 115 are communicated from the ASR engine 105 to the server 104. When the server 104 is a search engine, the server 104 executes one or more search queries using the candidate transcriptions 115, generates search results 116, and communicates the search results 116 to the mobile device 102 for display.

In more detail, during state (a), geotagged audio signals 107 to 109 are communicated to the ASR engine 105 over the networks 106. In general, one or more of the geotagged audio signals 107 to 109 include the voices of different users. Fewer or more geotagged audio signals may be communicated to the ASR engine 105 during state (a).

Although several of the voices encoded in the geotagged audio signals 107 to 109 may share a common language, different voices speaking a common language may have different accents that correlate to different geographic regions (i.e., that are "geo-correlated" accents). Accordingly, the geographic locations that are associated with the audio signals 107 to 109 may be used to cluster the audio signals by geographic region (and thus by accent, dialect, or speech pattern), and to adapt the one or more acoustic models 111 to better recognize speech that exhibit particular, geo-correlated accents, dialects, or speech patterns. In addition to voices, the geotagged audio signals 107 to 109 may also include ambient sounds or environmental noises that occur (naturally or otherwise) at a particular location.

During state (b), the ASR engine 105 receives the geotagged audio signals 107 to 109, and stores the geotagged audio signals 107 to 109 (or portions thereof) in a collection of audio signals (e.g., on a computer-readable storage medium). As described below, the collection of audio signals stored by the ASR engine 105 is used for training, building, generating, or otherwise adapting one or more geo-specific acoustic models 111 that are used to perform speech recognition on geo-tagged audio signals and utterances.

In FIG. 1, the ASR engine 105 receives an audio signal 107 that has been tagged with metadata 117 that references the location "New York City." Further, the ASR engine 105 receives an audio signal 108 that has been tagged with metadata 118 that references the location "Boston," and metadata 119 that references the "city" geographic location type (i.e., because "Boston" is a "city"). Additionally, the ASR engine 105 receives an audio signal 109 that has been tagged with metadata 120 that references the location "New England," and metadata 121 that references the location "Boston" ("Boston" is a city in "New England"). The geo-tagged locations associated with the respective audio signals my refer to a location of a mobile device, a user, a location referenced by the utterance, a default location, the ASR engine 105, the networks 106 or a portion of the networks 106, or some other location The metadata 117 to 121 (or some portion thereof) may, as illustrated, be associated with the audio signals 107 to 109 by the devices that communicate the metadata 117 to 121 to the ASR engine 105. Alternatively, the metadata 117 to 121 (or some portion thereof) may be associated with the audio signals 107 to 109 by the ASR engine 105, the search engine 104, or by another server, based upon inferring a location of a mobile device 102 (or of the user 114 of the mobile device 102) after receiving untagged audio signals.

The audio signals 107 to 109 may each include a two-second (or more) snippet of relatively high quality audio, such as sixteen kilohertz lossless audio. The metadata may reference the location of a device (or of a user a device) when audio was recorded, captured, generated or otherwise obtained, or the metadata may reference a location of the a device (or of the user of the device) at a time before or after the audio was recorded, captured, generated, or otherwise obtained. The audio signals 107 to 109 may be manually uploaded to the ASR engine 105 or, for users who opt to participate, the audio signals 107 to 109 may be automatically obtained and communicated to the ASR engine 105 without requiring an explicit, user actuation before each audio signal is communicated to the ASR engine 105.

The metadata 117 to 121 may describe locations in any number of different formats or levels of detail or granularity. For example, the metadata 117 to 121 may include a two dimensional coordinates (e.g., latitude and longitude), an address, or information that identifies a geographic region. When an audio signal is recorded in a moving vehicle, the metadata 117 to 121 may describe a path of the vehicle (e.g., including a start point and an end point, and motion data). Additionally, the metadata 117 to 121 may describe locations in terms of location type (e.g., "moving vehicle," "on a beach," "in a restaurant," "in tall building," "South Asia," "rural area," "someplace with construction noise," "amusement park," "on a boat," "indoors," "underground," "on a street," "forest").

Furthermore, the metadata 117 to 121 may describe locations in terms of a bounded area (e.g., expressed as a set of coordinates that define the bounded area), or may use a region identifier, such as a state name or identifier, city name, idiomatic name (e.g., "Central Park," "Chinatown," "TriBeCa"), a country name, or the identifier of arbitrarily defined region (e.g., "cell/region ABC123"). A single audio signal may be associated with metadata that describes one location or location type, or more than one location and/or location type.

The ASR engine 105 or the mobile device 102 may process the metadata 117 to 121 to adjust the level of detail of the location information (e.g., to determine a state associated with a particular set of coordinates), or the location information may be discretized (e.g., by selecting a specific point along the path, or a region associated with the path). The level of detail of the metadata may also be adjusted by specifying or adding location type metadata, for example by adding an "on the beach" tag to an audio signal whose associated geographic coordinates are associated with a beach location, or by adding a "someplace with lots of people" tag to an audio signal that includes the sounds of multiple people talking in the background. Where a particular audio signal is associated with metadata referencing two or more locations, the ASR engine 105 may filter the audio signal by removing metadata that references one or more of the locations.

The geographic locations referenced by the metadata can also be converted into discretized features to reduce the number of possible distinct locations. This could be done, for example, by reducing the resolution of latitude and longitude coordinates (e.g., from 0.001 degrees to 1 degree, or to 5 degrees), or by converting the latitude and longitude coordinates into a name of a geographic location (e.g., by using regions defined by the boundaries between countries, states, cities or provinces).

Because the ASR engine 105 adapts the one or more acoustic models 111 to enhance the recognition of speech that includes different accents, the audio signals that are used to adapt the one or more acoustic models 111 should include samples of different users' voices, accents, and dialects in different geographic locations. In this regard, the ASR engine 105 may use a voice activity detector to verify that the collection of audio signals stored by the ASR engine 105 includes audio signals in which voices are present, and to filter out or otherwise identify or exclude audio signals (or portions of the audio signals) that include ambient noise or environmental sounds only. For example the ASR engine 105 may remove portions of the audio signals that correspond to background noise that is occurs before or after a user speaks, or that occurs during pauses between words. The collection of the audio signals stored by the ASR engine 105 may include tens, hundreds, thousands, millions, or hundreds of millions of audio signals.

The decision by the ASR engine 105 to store or not store a particular audio signal (or portion thereof) may be based on determining that the user's voice is or is not encoded in the audio signal, respectively. Alternatively, storing an audio signal by the ASR engine 105 may include identifying a portion of the audio signal that includes the user's voice, altering the audio signal by removing the portion that does not include the user's voice or by associating metadata which references the portion that includes the user's voice, and storing the altered audio signal. Ambient noise or environmental sound portions of the audio signals may be stored by the ASR engine 105 for other purposes, for example to build geo-specific noise models.

Other context data or metadata associated with the audio signals 107 to 109 may also be stored by the ASR engine 105. For example, the audio signals stored by the ASR engine 105 can, in some implementations, include other metadata tags, such as tags that indicate whether background voices (e.g., cafeteria chatter) are present within the audio signal, tags that identify the date on which a particular audio signal was obtained (e.g., used to determine a sample age), tags that identify an accent of the user 114 of the mobile device 102, tags that identify a locale set by the user 114 of the mobile device 102 (e.g., tags that identify that the user 114 prefers British English or American English), or tags that identify whether a particular audio signal deviates in some way from other audio signals of the collection that were obtained in the same or similar location. For example, the tags may identify that a user that has no accent, or has a strong accent (e.g., a South African accent), and is using a mobile device in a geographic area that is associated with a different strong accent (e.g., an Australian accent), to avoid adapting an acoustic model using audio signals that do not accurately reflect an accent associated with a particular geographic area.

The ASR engine 105 may optionally filter audio signals to exclude particular audio signals that satisfy or that do not satisfy other criteria. For example, the ASR engine 105 may decide to not store audio signals that are older than a certain age, or that include background chatter that may uniquely identify an individual or that may otherwise be proprietary or private in nature. In an additional example, data referencing whether the audio signals stored by the ASR engine 105 were manually or automatically uploaded may be tagged in metadata associated with the audio signals, and the one or more acoustic models 111 may be adapted using only those audio signals that were automatically uploaded, or only those that were manually uploaded, or different weightings may be assigned to each category of upload during the adaptation of the acoustic models.

Although an explicit tag may be applied to the audio signals stored by the ASR engine 105 to reference a particular geographic location, in other implementations, such as where the association between an audio signal and a geographic location may be derived, an explicit tag is not required or is not used. For example, a geographic location may be implicitly associated with an audio signal by processing search logs (e.g., stored with the server 104) to infer a geographic location for a particular audio signal. Accordingly, 'receipt' of a geotagged audio signals by the ASR engine 105 may include obtaining an audio signal that does is not expressly tagged with a geographic location, and deriving and associating one or more geo-tags for the audio signal.

During state (c), an audio signal 112 is communicated from the mobile device 102 to the ASR engine 105 over the networks 106. The audio signal 112 includes an utterance 113 ("Pahk yah kah," a phonetic transcription of the term "Park your car," as might be spoken by a native Bostonian such as "Boston Bob") recorded by the mobile device 102 (e.g., when the user implicitly or explicitly initiates a voice search query). The audio signal 112 includes metadata 123 that references the geographic location "Boston." In addition to including the utterance 113, the audio signal 112 may also include a snippet of environmental audio, such as a two second snippet of audio that was recorded before or after the utterance 113 was spoken. While the utterance 113 is described an illustrated in FIG. 1 as a voice query, in other example implementations the utterance may be an voice input to dictation system or to a dialog system.

The geographic location ("Boston") associated with the audio signal 112 may be defined using a same or different level of detail as the geographic locations associated with the audio signals stored by the ASR engine 105. For example, the geographic locations associated with the audio signals stored by the ASR engine 105 may be expressed as geographic regions, while the geographic location associated with the audio signal 112 may be expressed as geographic coordinates. Where the level of detail is different, the ASR engine 105 may process the geographic metadata 123 or the metadata 117 to 121 to align the respective levels of detail, so that a subset selection process may be performed more easily.

The metadata 123 may be associated with the audio signal 112 by the mobile device 102 (or the user 114 of the mobile device 102) based on a current geographic location when the utterance 113 is recorded, and may be communicated with the audio signal 112 from the mobile device 102 to the ASR engine 105. Alternatively, the metadata may be associated with the audio signal 112 by the ASR engine 105, based on a geographic location that the ASR engine 105 infers for the mobile device 102 (or the user 114 of the mobile device 102).

The ASR engine 105 or the mobile device 102 may infer the geographic location using the user's calendar schedule, user preferences (e.g., as stored in a user account of the ASR engine 105 or the server 104, or as communicated from the mobile device 102), a default location, a past location (e.g., the most recent location calculated by a GPS module of the mobile device 102), information explicitly provided by the user when submitting the voice search query, from the utterance 113 themselves, triangulation (e.g., WiFi or cell tower triangulation), a GPS module in the mobile device 102, or dead reckoning. The metadata 123 may include accuracy information that specifies an accuracy of the geographic location determination, signifying a likelihood that the mobile device 102 (or the user 114 of the mobile device 102) was actually in the particular geographic location specified by the metadata 123 at the time when the utterance 113 was recorded.

In additional examples, the ASR engine 105 or the mobile device 102 may infer the geographic location using the user's average location over all his utterances, the user's "home location", (e.g. where the user currently lives, or where he grew up and his accent came from, as specified explicitly by the user or inferred from the accent), a 'smoothed' location that represents the location of the user over some recent period of time, a combination of the current location and the user's home location (e.g., a four-dimensional signal derived from the two, two-dimensional latitude and longitude), or the current location, as a continuous two-dimensional latitude and longitude signal.

Other metadata may also be included with the audio signal 112. For example, metadata included with the audio signals may include a location or locale associated with the respective mobile device 102. For example, the locale may describe, among other selectable parameters, a region in which the mobile device 102 is registered, or the language or dialect of the user 114 of the mobile device 102. The speech recognition module 124 may use this information to select, train, generate or otherwise adapt noise, speech, acoustic, popularity, or other models that match the context of the mobile device 102.

During state (d), the ASR engine 105 selects a subset of the audio signals that have been received by the ASR engine 105, and uses an acoustic model adaptation module 125 to train, generate, or otherwise adapt one or more acoustic models 111 (e.g., Gaussian Mixture Models (GMMs)) using the subset of the audio signals. For example the subset of the audio signals that are selected by the ASR engine 105 may be used as a training set for the one or more acoustic models 111.

The subset may include all, or fewer than all of the audio signals stored by the ASR engine 105. Machine learning techniques such as k-means may be used to select the subset. This selection may occur by comparing acoustic information from the audio signals 107 to 109 with acoustic information from the audio signal 112, to result in a subset that more accurately reflects actual geographical boundaries between different accents.

In general, the one or more acoustic models 111, along with noise models, language models, and/or other models, are applied to the audio signal 112 to translate or transcribe the spoken utterance 113 into one or more textual, candidate transcriptions 115, and to generate speech recognition confidence scores to the candidate transcriptions 115. In particular, the one or more acoustic models 111 include statistical representations of the sounds that make up each word of a particular language, and the noise models are used for noise suppression or noise compensation. Both models enhance the intelligibility of the spoken utterance 113 to the ASR engine 105.

In more detail, the acoustic model adaptation module 125 may adapt an acoustic model for the geographic location ("Boston") associated with the audio signal 112 using the audio signals 108 and 109, because the audio signals 108 and 109 were geotagged as having been recorded at or near that geographic location, or at a same or similar type of location. Furthermore, the audio signal 112 may itself be used to adapt the one or more acoustic models 111, in addition to or instead of using the audio signals 108 and 109. In adapting an acoustic model for a particular geographic location, the acoustic model adaptation module 125 adapts an acoustic model based on criteria that may correlate to a particular accent, dialect, or pattern of speech.

In another example, the acoustic model adaptation module 125 may adapt an acoustic model for another geographic location (e.g., "New York City"), using the audio signal 107 that was geotagged as having been recorded at or near that other geographic location, or at a same or similar type of location. If the acoustic model adaptation module 125 is configured to select audio signals that were geotagged as having been recorded near (e.g., within a predefined distance) the geographic location associated with the audio signal 112, the acoustic model adaptation module 125 may also adapt the one or more acoustic models 111 for "Boston" using the audio signal 107 that tagged "New York City," if "New York City" is within the predefined distance of "Boston."

In addition to using location criteria, other context data may be used to select the subset of the audio signals that the ASR engine 105 uses to adapt the one or more acoustic models 111, or to adjust a weight or effect that a particular audio signal has upon the adaptation of the one or more acoustic models 111. For example, the ASR engine 105 may select a subset of the audio signals whose context data indicates that they are longer than or shorter than a predetermined period of time, or whose context data indicates that they satisfy certain quality or recency criteria. Furthermore, the ASR engine 105 may select, as the subset, audio signals whose context data indicates that they were recorded using a mobile device that has a similar audio subsystem as the mobile device 102.

Other context data which may be used to select the subset of the audio signals may include, in some examples, time information, date information, data referencing a speed or an amount of motion measured by the particular mobile device during recording, other device sensor data, device state data (e.g., Bluetooth headset, speaker phone, or traditional input method), a user identifier (if the user opts to provide one), or information identifying the type or model of mobile device. The context data, for example, may provide an indication of the conditions surrounding the recording of the audio signal 112.

In one example, context data supplied with the audio signal 112 by the mobile device 102 may indicate that the mobile device 102 is traveling above walking speeds in an area that is associated with a body of water. Using this context data, the ASR engine 105 may infer that the audio signal 112 was recorded on a boat, and may select a subset of the audio signals that are associated with an "on a boat" location type, to better recognize an accent, dialect, or speech pattern that is common to an "on a boat" location type, such as an accent, dialect, or speech pattern used by fishermen or sailors.

In another example, context data supplied with the audio signal 112 by the mobile device 102 may indicate that the mobile device 102 is in a rural area. Based on this context data, the ASR engine 105 may infer that that the accuracy of the speech recognition would not be improved if the subset included audio signals that were recorded in urban areas. Accordingly, the context data may be used by the acoustic model adaptation module 125 to select audio signals that are to be used to adapt the one or more acoustic models 111, or to select the appropriate acoustic models 111 to use to recognize a particular utterance. In some implementations, the acoustic model adaptation module 125 may select a weighted combination of the audio signals stored by the ASR engine 105 based upon the proximity of the geographic locations associated with the audio signals to the geographic location associated with the audio signal 112.

The acoustic model adaptation module 125 may also adapt the one or more acoustic models 111 using audio included in the audio signal 112 itself. For instance, the acoustic model adaptation module 125 may determine the quality of the audio signals stored by the ASR engine 105 relative to the quality of the audio signal 112, and may choose to adapt the one or more acoustic models 111 using the audio signals stored by the ASR engine 105 only, using the audio signal 112 only, or using any appropriate weighted or unweighted combination thereof. For instance, the acoustic model adaptation module 125 may determine that the audio signal 112 includes very few utterances, or that other high quality audio signals that include multiple utterances are stored by the ASR engine 105 for that particular geographic location, and may choose to adapt the acoustic model without using (or giving little weight to) the audio signal 112.

In some implementations, the acoustic model adaptation module 125 selects, as the subset, the audio signals that are associated with the N (e.g., five, twenty, or fifty) closest geographic locations to the geographic location associated with the audio signal 112. When the geographic location associated with the audio signal 112 describes a point or a place (e.g., coordinates), a geometric shape (e.g., a circle or square) may be defined relative to that that geographic location, and the acoustic model adaptation module 125 may select, as the subset, audio signals stored by the ASR engine 105 that are associated with geographic regions that are wholly or partially located within the defined geometric shape. When the geographic location associated with the audio signal 112 describes an area, the acoustic model adaptation module 125 may select, as the subset, audio signals stored by the ASR engine 105 that are associated with geographic regions that are within a predetermined distance of any point of the area.

If the geographic location associated with the audio signal 112 has been defined in terms of a location type (i.e., "on the beach," "city"), the ASR engine 105 may select audio signals that are associated with a same or a similar location type, even if the physical geographic locations associated with the selected audio signals are not physically near the geographic location associated with the audio signal 112. For instance, because surfers across the world may use a similar accent or dialect, an acoustic model for an audio signal that was recorded on the beach in Florida may be tagged with "on the beach" metadata. In doing so, the acoustic model adaptation module 125 may select, as the subset, audio signals whose associated metadata indicate that they were also recorded on beaches, despite the fact that they may have been recorded on beaches in Australia, Hawaii, or in Iceland.

The acoustic model adaptation module 125 may select the subset of audio signals based on matching location types, instead of matching actual, physical geographic locations, if the geographic location associated with the audio signal 112 does not match, or does not have a high quality match (i.e., the match does not satisfy a predetermined quality threshold) with any physical geographic location associated with an audio signal stored by the ASR engine 105. Other matching processes, such as clustering algorithms, may be used to match the audio signal 112 with audio signals stored by the ASR engine 105.

In addition to generating 'generic,' geo-specific acoustic models 111, the acoustic model adaptation module 125 may adapt geo-specific acoustic models that are targeted or specific to other criteria as well, such as geo-specific acoustic models that are further specific to different device types or times of day. A targeted, acoustic sub-model may be adapted based upon detecting that a threshold criteria has been satisfied, such as determining that a threshold number of audio signals stored by the ASR engine 105 refer to the same geographic location and share another same or similar context (e.g., time of day, day of the week, motion characteristics, device type, etc.).

The one or more acoustic models 111 may be adapted before, during, or after the utterance 113 has been recorded by the mobile device 102. For example, multiple audio signals, incoming from a same or similar location as the utterance 113, may be processed in parallel with the processing of the utterance 113, and may be used to adapt the one or more acoustic models 111 in real time or near real time, to better approximate the accent, dialect, or others speech patterns of the people who live in the geographic area which surrounds the mobile device 102 when the utterance 113 is recorded.

Adaptation of the one or more acoustic models 111 may occur using at least four approaches. For instance, separate acoustic models may be built for each geographic location, geographic region, or locale. According to this approach, adaptation of the acoustic models 111 includes selecting the particular, geo-specific acoustic model that matches the geographic location associated with the audio signal 112, from among multiple acoustic models that have been built by the ASR engine 105 for multiple geographic locations.

According to a second approach, location information can be directly incorporated into an acoustic model. For example, the two-dimensional, continuous latitude and longitude coordinate vector can be directly stacked into the feature space used by the acoustic model, which already includes acoustic features such as Mel-frequency Cepstral Coefficients ("MFCCs"). According to this approach, fewer acoustic models need to be built, since the location information can be considered as part of the regular training process for a single acoustic model.

In more detail, the audio signals that are used to adapt the model (e.g., the audio signals 107 to 109) are divided into frames (e.g., 25 millisecond frames). A cepstral representation of each frame is derived using, for example, ten to forty MFCCs to describe the sounds of each particular frame. When training a model using a particular frame, a data set that includes both the MFCCs associated with the particular frame, and values that refer to a geographic location (e.g., geographic coordinates) is used to represent the frame.

According to a third approach, discretized location information may be incorporated as part of the state information included in the acoustic model. Specifically, the acoustic model maps states to probability distributions over the feature space so that, in addition to current phoneme and some contextual information about the preceding and following phonemes, the state can be augmented to include location information. During training, for each frame, the state may not be known exactly; sometimes, only a probability distribution over the states is known; in this case, a smoothed continuous location distribution or probability density function over the discretized location can be incorporated into the probability distribution over the states. Accordingly, location information is stored by the model at the phoneme level, instead of the acoustic feature level.

According to a fourth approach, which does not require the retraining an acoustic model, a single acoustic model is used for all locations within a language, however the acoustic model is adapted in a lightweight manner based on the geographic location. One such known technique for adapting acoustic models uses a Maximum-Likelihood Linear Regression ("MLLR"), which derives a transformation matrix that is applied to the Gaussian coefficients in the acoustic model space, or to the input features of the acoustic model, to adjust the model to match a set of adaptation utterances. The geographic location of the audio signal 112 may be used to define a geographic region, and all of the training audio signals stored by the ASR engine 105 that are associated with the region can be fed into the MLLR adaptation algorithm, to produce a matrix that may be used to transform the acoustic model to match the accent found in that region.

In more detail, a single, universal acoustic model may be generated for a particular region and/or language, such as an acoustic model that represents "United States English." The audio signals that are used to adapt the model (e.g., the audio signals 107 to 109) are used to generate linear transformations that transform the universal model to match the accent in a particular sub-region, by matrix multiplying the coefficients of the universal acoustic model by an appropriate linear transformation. The generation of the linear transformations and the adaptation of the universal acoustic model through matrix multiplication may occur on-the-fly, for example after the audio signal 112 has been received by the ASR engine 105.

During state (e), the speech recognition module 124 of the ASR engine 105 performs speech recognition on the audio signal 112 using the one or more geo-specific acoustic models 111 for the geographic location associated with the audio signal 112. When the audio signal 112 includes metadata that describes a device type of the mobile device 102, the ASR engine 105 may apply an acoustic model that is specific to both the geographic location associated with the audio signal, and to the device type of the mobile device 102. The speech recognition module 124 may generate one or more candidate transcriptions 115 that match the utterance encoded in the audio signal 112, and speech recognition confidence values for the candidate transcriptions.

During state (f), one or more of the candidate transcriptions 115 generated by the speech recognition module 124 are communicated from the ASR engine 105 to the server 104. When the server 104 is a search engine, the candidate transcriptions 115 may be used as candidate query terms that are used by the search engine to execute one or more search queries. The ASR engine 105 may rank the candidate transcriptions 115 based at least on their respective speech recognition confidence scores before transmission to the server 104. By transcribing spoken utterances and providing candidate transcriptions to the server 104, the ASR engine 105 may provide a voice search query capability, a dictation capability, or a dialogue system capability to the mobile device 102.

The server 104 may execute one or more search queries using the candidate query terms, and may generate a file 116 that references search results 126 and 127. The file 116 may be a markup language file, such as an eXtensible Markup Language (XML) or HyperText Markup Language (HTML) file.

The server 104, in some examples, may include a web search engine used to find references within the Internet, a phone book type search engine used to find businesses or individuals, or another specialized search engine (e.g., a search engine that provides references to entertainment listings such as restaurants and movie theater information, medical and pharmaceutical information, etc.). During state (h), the server 104 provides the file 116 that references the search results 126 and 127 to the mobile device 102.

During state (i), the mobile device 102 displays the search results 126 and 127 on the user interface 101. The user interface 101 includes a search box 129 that displays the candidate query term with the highest speech recognition confidence score ("Park your car"), an alternate query term suggestion region 130 that displays another of the candidate query term that may have been intended by the utterance 113 ("Parker Cole" and "Parka Card"), a search result 126 that includes a link to a resource for "Boston Parking," and a search result 127 that includes a link to a resource for "Cambridge Car Park."

Figure 2:
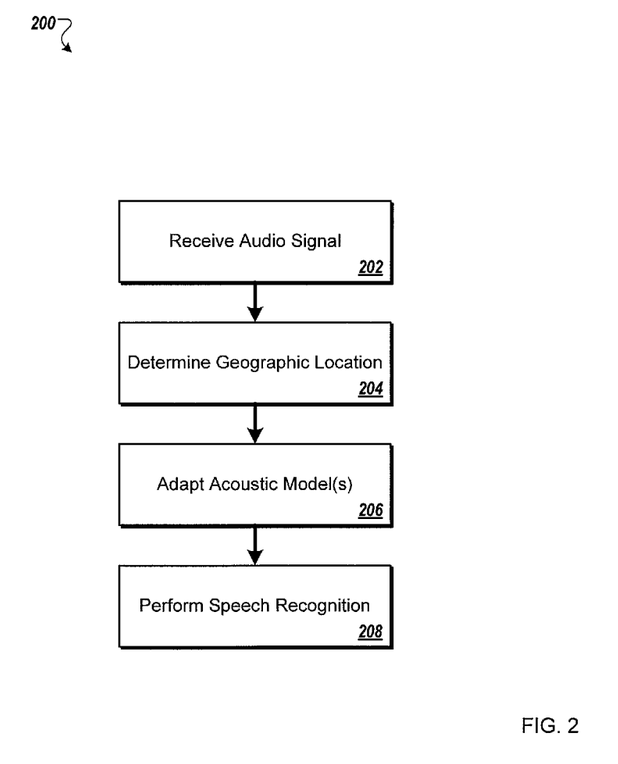
FIGS. 2 and 3 are flowcharts of example processes.

FIG. 2 is a flowchart of an example process 200. Briefly, the process 200 includes receiving an audio signal that corresponds to an utterance recorded by a mobile device, determining a geographic location associated with the mobile device, adapting one or more acoustic models for the geographic location, and performing speech recognition on the audio signal using the one or more acoustic models model that are adapted for the geographic location.

In more detail, when process 200 begins, an audio signal that corresponds to an utterance recorded by a mobile device is received (202). The utterance may include a voice search query, or may be an input to a dictation or dialog application or system. The utterance may include associated context data such as a time, date, speed, or amount of motion measured during the recording of the geotagged audio signal or a type of device which recorded the geotagged audio signal.

A geographic location associated with the mobile device is determined (204). For example, data referencing the particular geographic location may be received from the mobile device, or a past geographic location or a default geographic location associated with the mobile device may be identified.

One or more acoustic models are adapted for the geographic location (206). A subset of geotagged audio signals used for adapting the acoustic model may be selected by determining, for each of the geotagged audio signals, a distance between the particular geographic location and a geographic location associated the geotagged audio signal, and selecting those geotagged audio signals which are within a predetermined distance of the particular geographic location, or that are associated with geographic locations which are among the N closest geographic locations to the particular geographic location.

Adapting the one or more acoustic models may include selecting the one or more acoustic models generated for the geographic location associated with the mobile device, from among multiple acoustic models that have been generated for multiple geographic locations, or incorporating data that references the geographic location (e.g., geographic coordinates) into a feature space used by the one or more acoustic models. Alternatively, adapting the one or more acoustic models may include incorporating data that references the geographic location into state information included in the acoustic model, or deriving a transformation matrix associated with the geographic location; and applying the transformation matrix to a universal acoustic model.

The subset of geotagged audio signals may be selected by identifying the geotagged audio signals associated with the particular geographic location, and/or by identifying the geotagged audio signals that are acoustically similar to the utterance. The subset of geotagged audio signals may be selected based both on the particular geographic location and on context data associated with the utterance. Generating the acoustic model may include training a GMM using the subset of geotagged audio signals as a training set.

Speech recognition is performed on the audio signal (208). Performing the speech recognition may include generating one or more candidate transcriptions of the utterance. A search query may be executed using the one or more candidate transcriptions, or one or more of the candidate transcriptions may be provided as an output of a digital dictation application. Alternatively, one or more of the candidate transcriptions may be provided as an input to a dialog system, to allow a computer system to converse with the user of the particular mobile device.

Figure 3:
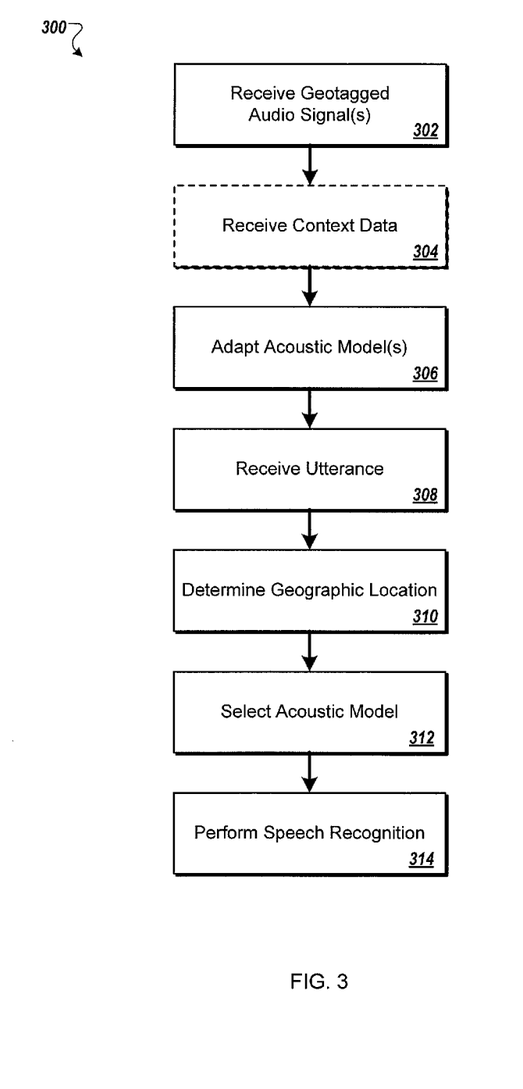

FIG. 3 is a flowchart of another example process 300. Briefly, the process 300 includes receiving geotagged audio signals and generating multiple acoustic models based, in part, upon particular geographic locations associated with each of the geotagged audio signals. One or more of these acoustic models may be selected when performing speech recognition upon an utterance based, in part, upon a geographic location associated with the utterance.

In more detail, when process 300 begins, geotagged audio signal corresponding to audio is received (302). The geotagged audio signal may be recorded by a mobile device in a particular geographic location. The received geotagged audio signal may be processed to exclude portions of the audio that do not include the voice of the user of the mobile device. Multiple geotagged audio signals recorded in one or more geographic locations may be received and stored.

Optionally, context data associated with the geotagged audio signal is received (304). The geotagged audio signal may include associated context data such as a time, date, speed, or amount of motion measured during the recording of the geotagged audio signal or a type of device which recorded the geotagged audio signal.

One or more acoustic models are adapted (306). Each acoustic model may be adapted for a particular geographic location or, optionally, a location type, using a subset of geotagged audio signals. The subset of geotagged audio signals may be selected by determining, for each of the geotagged audio signals, a distance between the particular geographic location and a geographic location associated the geotagged audio signal and selecting those geotagged audio signals which are within a predetermined distance of the particular geographic location, or that are associated with geographic locations which are among the N closest geographic locations to the particular geographic location. The subset of geotagged audio signals may be selected by identifying the geotagged audio signals associated with the particular geographic location. The subset of geotagged audio signals may be selected based both on the particular geographic location and on context data associated with the geotagged audio signals. Generating the acoustic model may include training a Gaussian Mixture Model (GMM) using the subset of geotagged audio signals.

An utterance recorded by a particular mobile device is received (308). The utterance may include a voice search query. The utterance may include associated context data such as a time, date, speed, or amount of motion measured during the recording of the geotagged audio signal or a type of device which recorded the geotagged audio signal.

A geographic location is determined (310). For example, data referencing the particular geographic location may be received from a GPS module of the mobile device.

An acoustic model is selected (312). The acoustic model may be selected from among multiple acoustic models adapted for multiple geographic locations. Context data may optionally contribute to selection of a particular acoustic model among multiple acoustic models for the particular geographic location.

Speech recognition is performed on the utterance using the selected acoustic model (314). Performing the speech recognition may include generating one or more candidate transcriptions of the utterance. A search query may be executed using the one or more candidate transcriptions.

Figure 4:
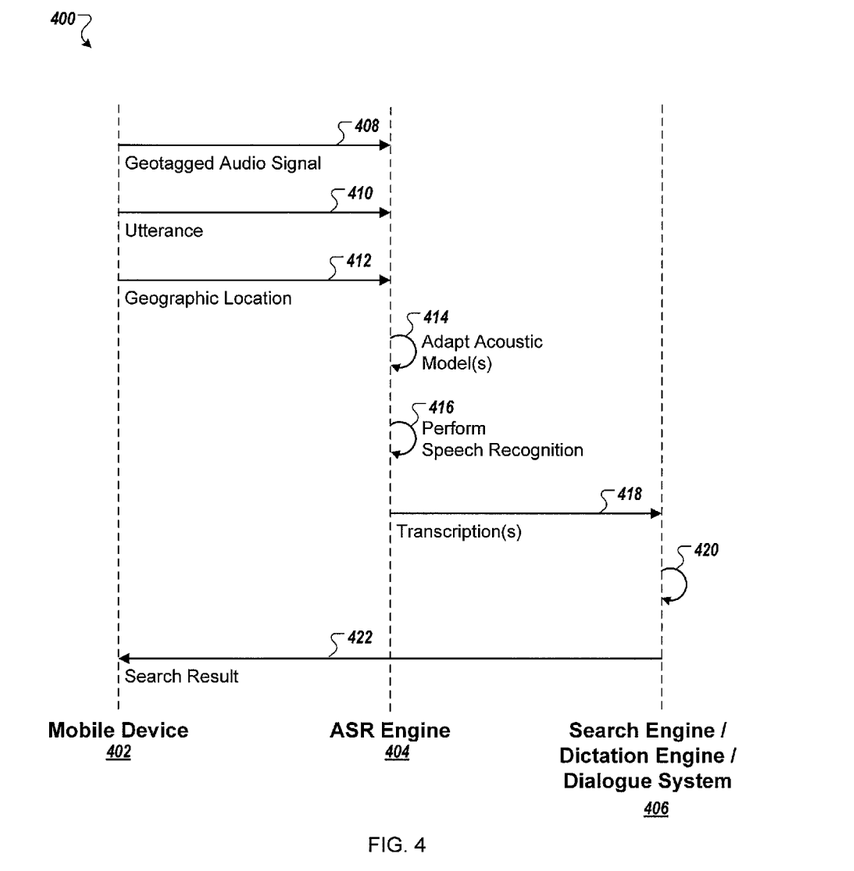
FIG. 4 is a swim lane diagram of an example process.

FIG. 4 shows a swim lane diagram of an example of a process 400 for enhancing speech recognition accuracy using geotagged audio. The process 400 may be implemented by a mobile device 402, an ASR engine 404, and a search engine 406. The mobile device 402 may provide audio signals, such as audio signals or audio signals that correspond to an utterance, to the ASR engine 404. Although only one mobile device 402 is illustrated, the mobile device 402 may represent a large quantity of mobile devices 402 contributing audio signals and voice queries to the process 400. The ASR engine 404 may adapt acoustic models based upon the audio signals, and may apply one or more acoustic models to an incoming voice search query when performing speech recognition. The ASR engine 404 may provide transcriptions of utterances within a voice search query to the search engine 406 to complete the voice search query request.

The process 400 begins with the mobile device 402 providing 408 a geotagged audio signal to the ASR engine 404. The audio signal may include audio of a voice of the mobile device 402, along with an indication regarding the location at which the audio was recorded. Optionally, the geotagged audio signal may include context data, for example in the form of metadata. The ASR engine 404 may store the geotagged audio signal in an audio data store.

The mobile device 402 provides 410 an utterance to the ASR engine 404. The utterance, for example, may include a voice search query. The recording of the utterance may optionally include a sample of audio, for example recorded briefly before or after the recording of the utterance.

The mobile device 402 provides 412 a geographic location to the ASR engine 404. The mobile device, in some examples, may provide navigational coordinates detected using a GPS module, a most recent (but not necessarily concurrent with recording) GPS reading, a default location, a location derived from the utterance previously provided, or a location estimated through dead reckoning or triangulation of transmission towers. The mobile device 402 may optionally provide context data, such as sensor data, device model identification, or device settings, to the ASR engine 404.

The ASR engine 404 adapts 414 an acoustic model. The acoustic model may be adapted, in part, by training a GMM. The acoustic model may be adapted based upon the geographic location provided by the mobile device 402. For example, geotagged audio signals submitted from a location at or near the location of the mobile device 402 may contribute to an acoustic model. Optionally, context data provided by the mobile device 402 may be used to filter geotagged audio signals to select those most appropriate to the conditions in which the utterances were recorded. For example, the geotagged audio signals near the geographic location provided by the mobile device 402 may be filtered by a day of the week or a time of day. If a sample of audio was included with the utterance provided by the mobile device 402, the audio sample may optionally be included in the acoustic model.

The ASR engine 404 performs speech recognition 416 upon the provided utterance. The utterance provided by the mobile device 402 may be transcribed into one or more sets of query terms using the acoustic model adapted by the ASR engine 404.

The ASR engine 404 forwards 418 the generated transcription(s) to the search engine 406. If the ASR engine 404 generated more than one transcription, the transcriptions may optionally be ranked in order of confidence. The ASR engine 404 may optionally provide context data to the search engine 406, such as the geographic location, which the search engine 406 may use to filter or rank search results.

The search engine 406 performs 420 a search operation using the transcription(s). The search engine 406 may locate one or more URIs related to the transcription term(s).

The search engine 406 provides 422 search query results to the mobile device 402. For example, the search engine 406 may forward HTML code which generates a visual listing of the URI(s) located.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A system comprising:
one or more computers; and
a computer-readable medium coupled to the one or more computers having instructions stored thereon which, when executed by the one or more computers, cause the one or more computers to perform operations comprising:
receiving an audio signal that corresponds to an utterance recorded by a mobile device,
determining a geographic location associated with the mobile device,
determining a geographic location type associated with the geographic location,
selecting a subset of geotagged audio signals based on the geographic location type associated with the geographic location of the mobile device, and based on context data associated with the utterance, wherein the context data comprises data that references a time or a date when the utterance was recorded by the mobile device, data that references a speed or an amount of motion measured by the mobile device when the utterance was recorded, data that references settings of the mobile device or data that references a type of the mobile device;
adapting one or more acoustic models for the geographic location type, and
performing speech recognition on the audio signal using the one or more acoustic models that are adapted for the geographic location type.

2. The system of claim 1, wherein adapting one or more acoustic models further comprises adapting one or more acoustic models before receiving the audio signal that corresponds to the utterance.

3. The system of claim 1, wherein adapting one or more acoustic models further comprises adapting one or more acoustic models after receiving the audio signal that corresponds to the utterance.

4. The system of claim 1, wherein adapting the acoustic model comprises training a Gaussian Mixture Model (GMM) using a subset of geotagged audio signals as a training set.

5. The system of claim 1, wherein the utterance represents a voice search query, or an input to a digital dictation application or a dialog system.

6. The system of claim 1, wherein determining the geographic location type further comprises receiving data referencing the geographic location type from the mobile device.

7. The system of claim 1, wherein determining the geographic location type further comprises determining a past geographic location or a default geographic location associated with the mobile device.

8. The system of claim 1, wherein the operations further comprise:
generating one or more candidate transcriptions of the utterance; and
executing a search query using the one or more candidate transcriptions.

9. The system of claim 1, wherein adapting one or more acoustic models for the geographic location type further comprises:
selecting, from among multiple acoustic models that have been generated for multiple geographic location types, the one or more acoustic models generated for the geographic location type associated with the geographic location of the mobile device.

10. The system of claim 1, wherein adapting one or more acoustic models for the geographic location type further comprises:
incorporating data that references the geographic location type into a feature space used by a single acoustic model.

11. The system of claim 10, wherein incorporating data that references the geographic location type into a feature space used by the single acoustic model further comprises incorporating values into a feature space used by the single acoustic model, wherein the values comprise Mel-frequency Cepstral Coefficients and geographic coordinates.

12. The system of claim 1, wherein adapting one or more acoustic models for the geographic location type further comprises incorporating data that references the geographic location type into state information included in a single acoustic model.

13. The system of claim 1, wherein adapting one or more acoustic models for the geographic location type further comprises:
deriving a transformation matrix associated with the geographic location type; and
applying the transformation matrix to a single, universal acoustic model.

14. The system of claim 1, wherein the geographic location type comprises a beach geographic location type, a restaurant geographic location type, a building geographic location type, a city geographic location type, a country geographic location type, a rural geographic location type, an urban geographic location type, a construction geographic location type, an amusement park geographic location type, a forest geographic location type, an indoor geographic location type, or an underground geographic location type.

15. A computer non-transitory storage medium encoded with a computer program, the program comprising instructions that when executed by one or more computers cause the one or more computers to perform operations comprising:
receiving an audio signal that corresponds to an utterance recorded by a mobile device;
determining a geographic location associated with the mobile device;
determining a geographic location type associated with the geographic location;
after receiving the audio signal that corresponds to the utterance, selecting a subset of geotagged audio signals based on the geographic location type associated with the geographic location of the mobile device, and based on context data associated with the utterance, wherein the context data comprises data that references a time or a date when the utterance was recorded by the mobile device, data that references a speed or an amount of motion measured by the mobile device when the utterance was recorded, data that references settings of the mobile device or data that references a type of the mobile device;
adapting one or more acoustic models for the geographic location type using the subset of geotagged audio signals selected after receiving the audio signal that corresponds to the utterance; and
performing speech recognition on the audio signal using the one or more acoustic models that are adapted for the geographic location type.

16. A computer-implemented method comprising:
receiving an audio signal that corresponds to an utterance recorded by a mobile device;
receiving a data tar associated with the audio signal, wherein the data tar identifies an accent of a user of the mobile device;
determining a geographic location associated with the mobile device;
determining a geographic location type associated with the geographic location;
selecting a subset of geotagged audio signals based on the geographic location type associated with the geographic location of the mobile device, and based on context data associated with the utterance, wherein the context data comprises data that references a time or a date when the utterance was recorded by the mobile device, data that references a speed or an amount of motion measured by the mobile device when the utterance was recorded, data that references settings of the mobile device or data that references a type of the mobile device;
adapting one or more acoustic models for the geographic location type based on the accent of the user of the mobile device; and
performing speech recognition on the audio signal using the one or more acoustic models that are adapted for the geographic location type.

* * * * *

UNITED STATES PATENT AND TRADEMARK OFFICE
CERTIFICATE OF CORRECTION

PATENT NO. : 8,468,012 B2  
APPLICATION NO. : 12/787568  
DATED : June 18, 2013  
INVENTOR(S) : Matthew I. Lloyd and Trausti T. Kristjansson Page 1 of 1

It is certified that error appears in the above-identified patent and that said Letters Patent is hereby corrected as shown below:

In the Claims:

Claim 16, column 20, line 39, delete "tar" and insert -- tag -- therefor.

Claim 16, column 20, line 40, delete "tar" and insert -- tag -- therefor.

Signed and Sealed this  
Third Day of September, 2013

Teresa Stanek Rea  
*Acting Director of the United States Patent and Trademark Office*